United States Patent Office 3,707,367
Patented Dec. 26, 1972

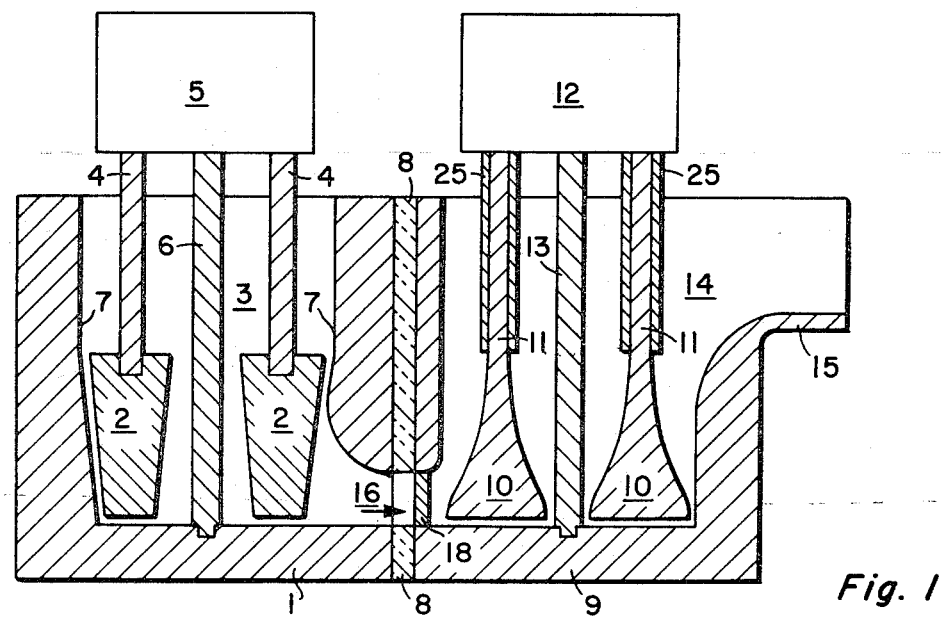
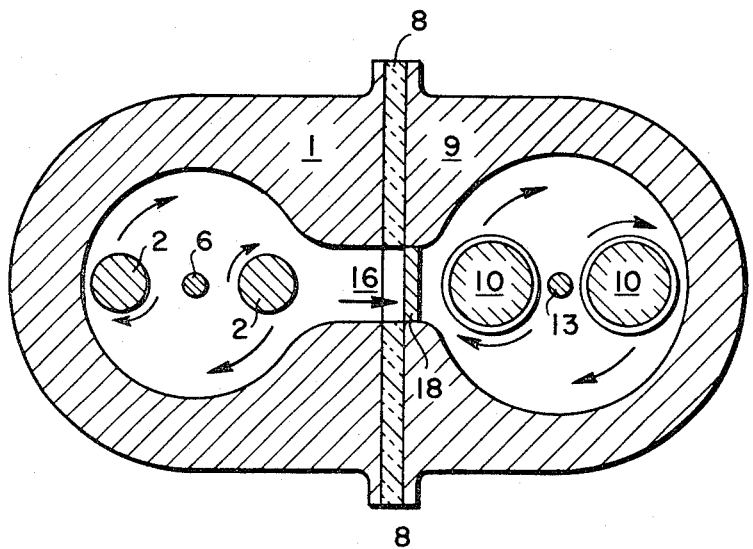
Fig. 1
Fig. 2

3,707,367
METHOD FOR FOAMING METALS
Johan Bjorksten, Madison, and Edward J. Rock, Blue
Mounds, Wis.; said Rock assignor to Bjorksten, Inc.
Filed May 3, 1971, Ser. No. 139,606
Int. Cl. B22d 25/00, 25/06
U.S. Cl. 75—20 F
12 Claims

ABSTRACT OF THE DISCLOSURE

Fiber reinforced foamed metal is produced by feeding to a foaming vessel a composition of reinforcing fibers, a foaming agent and a metal melting below the gas release temperature of this agent. This composition can be prepared and fed continuously from a compounding vessel, preferably connected with the foaming vessel, or the components can be added separately and directly in batch operation. In the foaming vessel they are combined with the remaining components of the final composition and brought to foaming temperature. All mixing after the fibers are added is done with rollers with ample clearances, as otherwise the fibers will be damaged. Rollers with both axial and planetary motion are preferred.

BACKGROUND OF THE INVENTION

The desirability of cellular foamed metal was envisaged by Sosnick (U.S. Pats. 2,434,775 and 2,553,016) who so far as is known, never produced this material. This was done successfully by Elliott (U.S. Pat. 2,751,289), who introduced the concepts of using a eutectic and of grinding to incorporate foaming agent. Fibers would have been stuck, ruptured, and destroyed in Elliott's process, or in any other grinding procedure.

The greatest structural weakness of foamed metals has been their sudden brittle type breakage when overloaded. Numerous attempts have been made by almost everybody working in this field to effect fiber reinforcing, the most likely means to cure this defect. So far only very limited results have been obtained, as most fibers are not wetted by the metals, those which are wetted will often be damaged by the molten metals, and surviving candidate fibers are destroyed by the amount and kind of agitation required to incorporate them.

The reasons why it has heretofore been impossible to produce acceptable fiber reinforced metal foams are: high speed or intense mixing necessary to wet and disperse the foaming agent in the metal will destroy the fibers. A lesser degree of mixing will not suffice to properly disperse the foaming agent. If mixing speed or severity is reduced, the foaming agent will decompose before the fibers are incorporated, and they will be damaged even then. Lack of intensity of mixing with any previously used type of slow mixer will cause the fibers to separate from the metal because of the differences in specific gravity and the fact that the metals used have a low viscosity in the liquid state. The metals, on melting, do not go through the stringy "long" high viscous state of glasses, plastics and ceramics which is favorable to stability in mixes or foams.

OBJECTS OF THE INVENTION

An object of the present invention is a process for producing a high strength, small cell, foamed metal.

Another object is to produce a high strength, closed cell, fiber reinforced foamed metal.

Another object is a machine designed to continuously produce superior foamed metal products.

Further objects will become apparent as the following detailed description proceeds.

SHORT STATEMENT OF THE INVENTION

The machine consists essentially of a foaming vessel, preferably connected to a pre-mixer by a well dimensioned opening adequate to permit the ready flow even of a viscous, fiber containing mass. Agitation is provided in both foaming and pre-mix vessels. To the foaming vessel are fed a foaming agent pre-milled to particles of the desired small size, an alloy melting at a temperature at which the foaming agent is relatively stable, and reinforcing fibers. There it is met by the principal component metal heated to a temperature at which the foaming agent evolves a gas to foam in cells typically about 10 to 15 times the diameter of the dispersed foaming agent particles.

The foamed metal which results in this manner may flow by gravity onto a moving belt for such further processing as may be desired.

THE DRAWINGS

The invention is further illustrated in the drawings, of which FIG. 1 is a side section view, not showing fiber, foamer, and eutectic feeding units, and not showing foam and foam conveyor, taken along the section line A—A of FIG. 4.

FIG. 2 is a top section view taken along the section line B—B of FIG. 3.

DETAILED DESCRIPTION OF THE INVENTION

Figure 3:
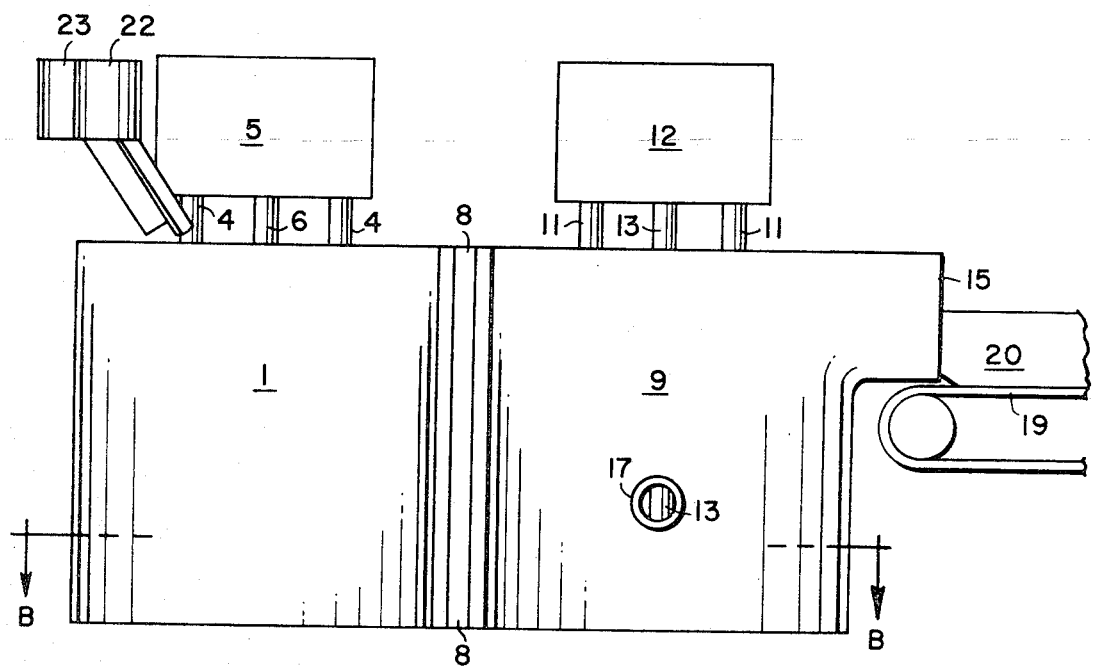
FIG. 3 is a side view.

Referring to FIG. 1 and FIG. 2, a cast iron pot 1 contains two conical or cylindrical cast iron stirrers, or agitators, 2, which rotate, preferably at different speeds, normally within the general range 20 to 1000 r.p.m. Above them is substantial spacing, 3, so that a liquid head can be maintained above the stirrers. The stirrers are driven by shafts, 4, which in turn are attached to a rotatable assembly, 5, which turns around the shaft, 6, so as to give the said stirrers a planetary motion in any of the ways well known to the art, preferably by gears or chain drives. The stirrers are mounted substantially in parallel with the inner wall of the pot, 7, so that a preferably uniform clearance adequate to avoid damage to the fibers exists between the pot surface and the stirrer surface. Usual clearances are ¼–1".

The shaft, 6, is driven by suitable means, preferably an electric motor. The stirrers, 2, are driven from this shaft by cog or chain-sprocket drive, or equivalent, represented by 5. Adjoining pot 1, and separated from it by a high temperature resistant gasket, 8, suitably of asbestos, or "Fiberfrax" aluminum silicate is another pot, 9, usually of about the same size as pot 1 and equipped with a similar stirring assembly except that here the stirrers, 10, are inverted, and cover a major part of the bottom of the pot, 9, tapering off to only the width of shafts, 11, as shown in the drawing. The shafts are driven as in pot 1 by a rotating assembly, 12, which again gives the stirrers, 10, a planetary motion around shaft 13. The area 14 indicates where the wall opens on a spout, 15, to lead away the foam formed in the operation, as indicated by the arrow.

Pots 1 and 9 are separated from each other by the gasket, 8, and united by an aperture, 16, which extends through both pots and gasket, 8, so as to permit flow in the direction of the arrow in accordance with internal pressures. Optionally, a valve or flap, 18, may block flow in one direction, so as to prevent flow in the direction from pot 9 to pot 1.

In this embodiment of the invention, it is seen that the foaming takes place in pot 9. Pot 1 serves essentially for preparing the feed of eutectic or low melting alloy, foaming agent and fiber into pot 9, where the foaming occurs. It is possible to replace pot 1 with other feeding means, to alter the profile, speed or direction of the rollers as may fit the particular compositions it may be desired to foam, or to adapt to either continuous or intermittent operation. We use the term "roller" broadly to describe axially rotating members rounded in cross section. The term "rounded" includes elliptical for example.

If the fiber containing foam as produced is highly viscous, it may be desirable to tilt the foaming assembly FIG. 1 to the right, so that the spout 15 is lowered and flow thus facilitated by gravity and pressure from both the spout, and through the raw materials supply gate 15. Likewise, in FIG. 5 the central pot 9 can be tilted toward the spout side so that the outlet side, 27, is lowered and the discharge of viscous foam thus facilitated. In this case the ingredients supply pots may remain stationary, and the tilting done with the feeder openings 16 as axes, so that the raw material supply to the foaming pot, 9, from the raw material preparation pots 1 and 26 remains open, and continuous operation of the foaming vessel is unimpeded.

Optional sleeves 25 on shafts 11 are provided for the purpose of preventing agitation and possible destruction of the foamed product due to the rotation of shafts 11.

Figure 4:
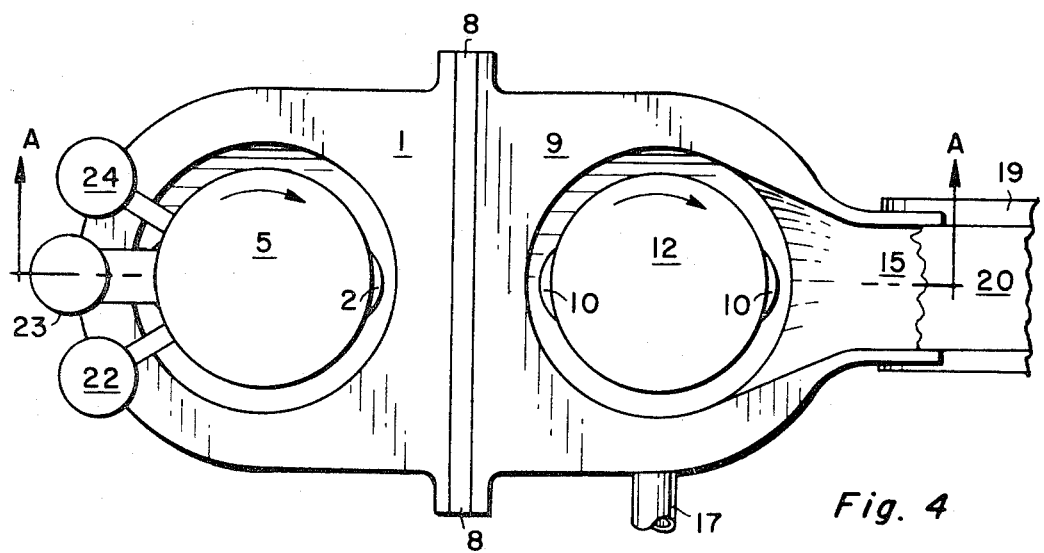
FIG. 4 is a top view.

FIGS. 3 and 4 show feed pipe 17 through the wall of pot 9. 19 is a take off belt of stainless steel or like heat resistant material, and 20 a flow of foamed metal produced, which is being conveyed away from the apparatus while cooling.

Shown specifically in the top view, FIG. 4, are a feeder for foaming agent 22, a feeder for reinforcing fiber 23, and a feeder for eutectic or low melting alloy composition or powder, 24. The construction of these feeders is irrelevant to this invention, because any device capable of feeding controlled or programmed quantities of the ingredients is suitable, and a large number of these is described in any engineering textbook, on mechanical conveying. Thus they may be screw or belt or disc conveyors, peristaltic devices, magnetic conveyors, vibrating tables or screens, and any equivalent of these. The raw materials may be premixed, and then handled by a single feeding means; however, we find it more flexible to feed them separately so as to be able to control the individual proportions and vary these at will. A separate feeder is used for the molten aluminum, which requires a different temperature. The aluminum may be fed solid to a melting device such as an induction furnace, or it may be handled as a liquid, preferably in aluminum oxide coated cast iron equipment.

Figure 5:
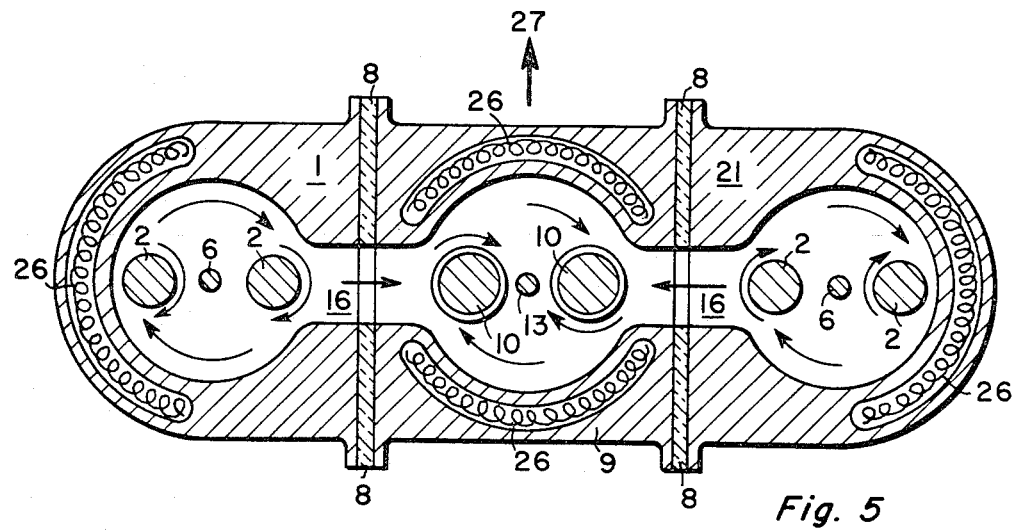
FIG. 5 is a top section view, similar to FIG. 2, showing another embodiment of the invention.

FIG. 5 further shows a third pot, 21, which in all details is a mirror image of pot 1, including stirrer assembly, feed assemblies and discharge ports or apertures, 16. The foamed metal is fed upward and out of pot 9 in the direction indicated schematically by the arrow 27.

A revolution and rotation configuration is shown to better portray the rotation of the stirrers, and is, of course, only one of a variety of possible mixing configurations.

All of the pots are heated by electrical, 26, or other suitable means, so that when aluminum is to be foamed, the central pot will operate in the range of about 660° and the end pots at about 500° C. The heating and controlling means are conventional.

Figure 6:
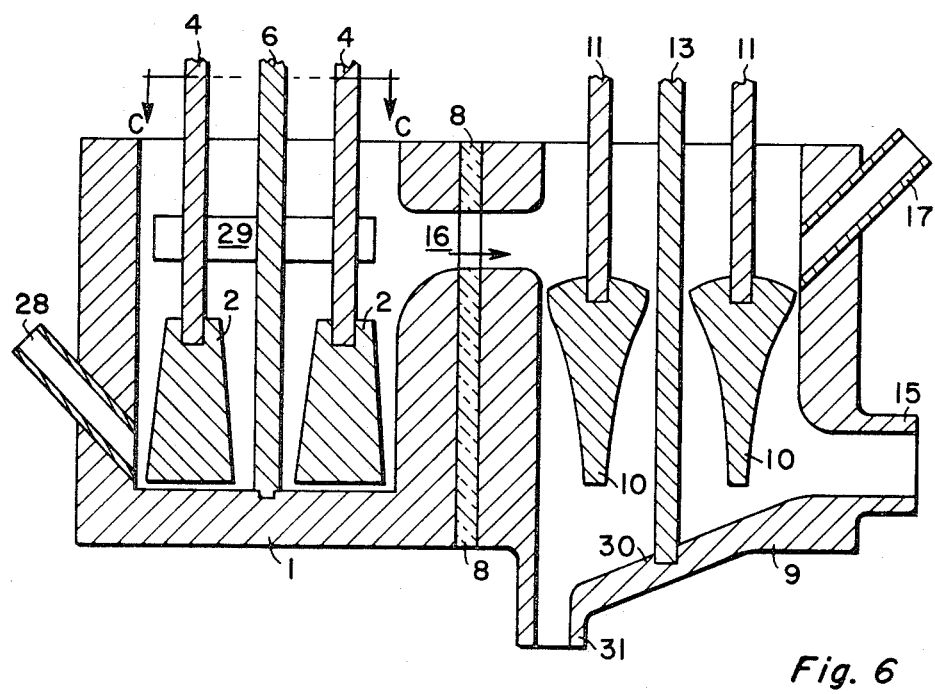
FIG. 6 is a side section view, similar to FIG. 1, showing yet another embodiment of the invention.

Another embodiment of the invention is shown in FIG. 6. Low melting or eutectic alloy, foaming agent and fiber, are supplied by means represented by tube 28, into pot 1. The eutectic preferably enters pot 1 in the molten state, thus providing pressure to force the eutectic, foamer, and fiber mixture upward.

Figure 7:
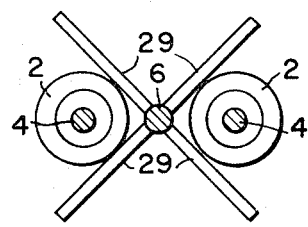
FIG. 7 is a detail top view taken along the section line C—C of FIG. 6.

An impeller, 29, driven by the planetary motion, is affixed to shaft 6 (shown specifically in FIG. 7) so that the eutectic mixture upon reaching the level of impeller 29, is driven through aperture 16 into pot 9. Aluminum is fed in the upper region of pot 9 through pipe 17. Stirring rollers 10 encourage the resultant foamed aluminum to expand into the lower region of pot 9 where the foamed product passes through spout 15 and onto conveyance means previously described.

Should a quantity of metal fail to foam in passage from the upper to the lower region of pot 9, the metal seeks the bottom of pot 9, flows by gravity on lower surface 30, and is expelled at the bottom spout 31.

EXAMPLE 1

Zirconium hydride was comminuted in a "Gem-X" model Trost Air Impact Pulverizer made by Trost Equipment Co., Newtown, Pa., to an average particle size of 0.75 micron. The comminution was carried out with 100 lbs. nitrogen pressure, and the resultant powder was kept under nitrogen until incorporated with the aluminum-magnesium eutectic. This latter process was carried out by adding 25 grams of the micronized zirconium hydride to 200 grams of an alloy of 35% magnesium and 65% aluminum at 500° C. in the mixing vessel 1, FIGS. 1 and 2. The hydride was completely dispersed on agitation with the stirring mechanisms shown using a planetary speed of 130 r.p.m. and an axial rotation speed of 380 r.p.m. for both rollers. The time needed for complete dispersion and wetting of the hydride was 30 minutes if the rotation of the rollers was opposite to the direction of rotation of the planetary motion, and 80 minutes if these rotations were in the same direction.

When the hydride was dispersed, or concurrently with the dispersion of the hydride, the fibers were added. Incorporation of the fibers uniformly in the metal melt required 35 minutes. Using ½" fibers, and ¼" clearance it was necessary to mix these with axial roller rotations in the same direction as the planetary motion, as otherwise the fibers would aggregate unevenly. However, using much shorter fiber and/or wider clearance it may be possible to effect the mixing with these rotations opposing each other to create greater turbulence. Even when 4" fibers of aluminum coated 15 micron glass were used there was no measurable tearing or damage to the fibers using the mixing condition first stated. The weight of the fibers was 40 grams.

Upon attainment of a really uniform mix, 800 grams of aluminum were added pre-heated to a temperature of 790° C.

Foaming occurred immediately and was completed in 20 seconds. The resultant foam showed excellent dispersion of the fibers and commensurate strength.

EXAMPLE 2

Zirconium hydride was ballmilled and passed through a cyclone type separator to separate 400 g. of 0.03 to 2 micron fraction. This was fed into pot 1, FIG. 4 at 22. ⅜" long aluminum coated glass fibers, 15 micron diameter, coated by passing through melted aluminum, were fed by feeding means 23, in the form of a random mat, unbonded. Aluminum-magnesium eutectic was fed at 24 in the form of 6 to 16 screen granules. The proportion of feed was, in the order mentioned, 2–¼:17:71. Aluminum was fed into pot 9 through aperture 17, and was there mixed with the above ingredients entering foaming pot 9 through 16.

The temperature of the pot 1 was 460° C., and of pot 21 was 660° C., both electrically controlled. The total material feed was controlled centrally through proportioning devices, coupled so that the proportion remained constant as stated, while the overall speed was governed by the take-off rate or the flow rate through spout 15. Thus, once satisfactory operation had been obtained under manual control, the automatic control was allowed to take over and kept the preset proportions constant, and the input total equal to the combined output, which was 65 g./min.

An inert atmosphere of nitrogen or argon gas was maintained over the equipment. This was a necessity, particularly in pot 1, where the micron size zirconium hydride powder being added to melted aluminum-magnesium eutectic easily catches fire unless blanketed. The agitator rollers were raised slightly so as to provide a clearance of ⅜″ to the sides. The agitator cones were revolving at 380 r.p.m. and the planetary assembly at 125 r.p.m., all clockwise.

As material was fed into pre-mix pot 1, the composition, thick because of the fiber content, was slowly flowing into foaming pot 9, where it encountered the much hotter aluminum into which it rapidly dispersed under influence of the strong mechanical forces generated by the rapidly revolving inverted cone type rollers in planetary motion in pot 9. The foaming, which commenced and proceeded rapidly as soon as the zirconium hydride encountered temperatures above 500° C. tended to spread out the fibers, and help their rapid dispersion in the aluminum.

As foaming progressed, the resultant mass expanded, moving upwardly as a thick "batter." The mass in pot 1 was essentially gas free and therefore created a constant hydrostatic pressure on the material in pot 9, as the foaming material obviously had several times lower specific gravity. Under this pressure, the foam moved upwardly, and was discharged over spout 15 onto the conveyor belt 19, FIG. 3, for removal or further processing. This can include for example cooling by air, fog or waterspray or otherwise, painting or coating, cutting or stamping into desired shapes, forming while still hot, and the like. With the fiber content used, the flow at spout 15 became a limiting factor. This flow was facilitated by tilting the entire apparatus 35° toward the spout, so that this was lowered.

While reference has been made specifically to aluminum by way of example, the same machine and process are applicable to the foaming of zinc, bismuth, lead, or any of their alloys, and with suitable modification in the choice of construction materials also to steel, nickel, beryllium and their alloys and possibly even to refractory metals such as molybdenum, niobium, tantalum and the like. For these and similar metals we would use pots made of graphite, and as foaming agents metals boiling at temperatures between the melting points of eutectics of such metals and the major component metals themselves. The agitators could likewise be made of graphite, silicon carbide, boron nitride and the like, or of the fiber reinforced composites covered in the copending patent application Ser. No. 187,872, filed Oct. 8, 1971. In working with aluminum, cast iron equipment is adequate.

Foams resultant from the above machine may contain bubbles down to sub micron size in diameter, accordingly, a far superior product results. When bubbles are extremely small, the probability of any particular bubble being pierced or damaged by a reinforcing fiber is very low. Accordingly the mechanical strength of such foams is many times higher than that of conventional metal foams.

Among foaming agents suitable for the practice of the invention are also titanium hydride, oxygen hydride when bound so as not to be released at low temperatures, as for example in chromite or in chrysotile asbestos; lithium hydride, lithium aluminum hydride, magnesium hydride, magnesium nitride, and the like.

It is also possible to use this apparatus for foaming by the use of two separately dispersed interacting substances. For example, in making foamed steel or other ferrous alloys, or nickel alloys, we may mix an excess of carbon into steel in pot 1, and micron sized iron oxide in pot 21, (FIG. 5). In operation, these will both flow into pot 9, where the carbon and the iron oxide, combined in substantially stochiometric proportions, will interreact forming carbon monoxide cells in the matrix metal, thus producing a foam.

Generally we prefer to comminute the foaming agent to an average particle size of about ½–1 micron diameter or even less, but as a practical compromise, we may use powders as coarse as 10 micron average. The carrier alloy matrix does not need to be the precise eutectic, though working at lower temperatures is usually preferable. We can use for the initial dispersion any metal in which the foaming agent is stable. A true solution, when achievable, may even be preferable to a fine dispersions, as in the above instance of carbon in ferrous alloys, or zinc dissolved in steel (3%) used to foam stainless steel, preferably in vacuum.

As reinforcing fibers we prefer to use fibers of a metal not very soluble in the alloy being foamed such as cast iron fibers for aluminum, or palladium fibers for copper, or ceramic fibers such as glass fibers, metal coated by passing newly formed hot fibers through a metal bath, so as to secure unimpeded wetting of the ceramic center by the metal.

The preferred alloy for foaming aluminum is a eutectic of approximately ⅓ of magnesium to ⅔ of aluminum melting below 500° C. Addition of lead and antimony or titanium appear to facilitate the wetting of fibers by these metals and/or to further depress the melting point.

As to quantity of reinforcing fibers, we prefer to use as much as can be incorporated without critically impeding flow in the foaming machine, or crowding the bubbles too much. The upper limit appears to be about 40% of fiber on the total composition, but 2–10% is the generally preferred range. Even the addition of 1% of ½″ fibers of aluminum coated borosilicate glass 15 microns thick, to a 7% magnesium, 93% aluminum alloy by the procedures above outlined resulted in an increase of tensile and of flexural strength in excess of 300%.

The smaller the gas cells are, the less influence will the presence of fibers have on their stability. When for example the zirconium hydride used as the foaming agent has an average particle diameter of 1 micron, the primary initial cell diameter will be approximately 12 microns and will grow as some measure of coalescence of bubbles will always occur as the foam expands. Thus using foaming agent particles averaging 10 microns in diameter, the average cell diameter will be 120 microns initially, and may grow to as much as 500 microns average. In any event we prefer to keep the cells smaller than ⅒ of the average distance between the reinforcing fibers.

To avoid damage to the reinforcing fibers we prefer to provide a clearance of at least 1/32″ between the agitators and the walls and bottom of the pots. The upper limit of this clearance will depend on the peripheral velocity of th agitators both in axial and planetary rotation, and on the desired velocity of flow. Generally, a clearance of ¼″ to 1″ is preferred, though in extremely large machines exceeding any dimensions yet contemplated, proportionately gigantic clearances of say 10″ and more, might yet come to pass. The test should be that the motion of the agitator should cause a strong motion of the mass in the entire width of the clearance, but not such extreme shear as to cause destruction of the fibers. Generally, for incorporating fibers, we prefer to have the direction of the axial rotation of the mixing rollers coincide with the direction of their planetary motion.

In vessel 9, where the foaming occurs with consequent expansion of volume, the cross-sectional free area of the vessel should increase with the distance from the bottom in about the same proportion as foaming proceeds to completion. At the point where foaming is complete, the change in geometry of the cross section of the vessel should cease. Thus, the rate of flow is maintained steady, and turbulence in the foam is minimized.

In addition to the ingredients above listed, we may also add foam stabilizers, such as small particulate matter of aluminum oxide or other submicron particles adapted to align in the interphases and increase foam stability.

When a high melting metal is foamed, we prefer to use refractory fibers, such as fibers of tungsten, boron, graphite and silicon carbide or aluminum silicate.

A principal point of the invention is the production of fiber reinforced foamed metal using a method which comprises feeding reinforcing fibers, a gas releasing agent, and a minor proportion of a metallic composition melting below the gas release temperature of said agent, then adding a major proportion of a metal composition melting above the said gas release temperature into a mixing vessel, agitating by means of revolving rollers and removing the fiber reinforced foam. To this end we prefer to use a foaming vessel in which the components are fed near the bottom and there meet the hotter principal component of the matrix at a temperature sufficiently elevated to cause gas release in the particular system used. The foam then rises, and is discharged. The viscosity and coherence of a fiber reinforced metal foam is extremely high and its flow rate is frequently a limiting factor in production. It can be accelerated by downward discharge of the foam as in FIG. 6, or by tilting the device of FIG. 1 or pot 9 in FIG. 5 so as to lower the discharge spout or gate. The gas releasing agent is preferably pre-comminuted to a particle size below about 10 micron average diameter. If lithium hydride is used, it may be injected in the melted state with an atomizer.

In foaming aluminum alloys, we generally prefer to work with the temperature of the eutectic or low melting alloy into which the gas former and the fibers are dispersed below about 500° C. and the temperature of final mixing with the aluminum component of the matrix and foaming above about 600° C., the axial speeds of the mixing rollers between 20 and 1000 r.p.m. and preferably between 50 and 400 r.p.m. and the rotational speed of the planetary motion between 15 and 500 r.p.m. and preferably between 50 and 250 r.p.m.

The agitating means have been designed to minimize damage to the reinforcing fibers and to provide effective incorporation of these in the product. While we have found the roller type planetary motion agitators described to be particularly advantageous both from the standpoint of minimizing ablation, minimizing damage to fibers, and minimizing foam breakage, it would be possible to make the apparatus function to some degree with other types of agitators, particularly if these are made of graphite or boron nitride to minimize the corrosion or ablation which becomes quite noticeable when the design deviates from roundness. For example slow large paddles could be used, as well as double turbine mixers or larger slow propellers. From an all around performance standpoint, however, the mixers described herein appear decidedly superior.

In foaming metals melting substantially above 1000° C., we prefer feeding into vessel 1, FIG. 5 the metal, for example steel, with addition of 3% carbon, and to vessel 21 the same metal with addition of an oxide containing 4% oxygen on the weight of total metal fed thru the same vessel. The percentages may vary, it is only desired that the proportions be such that carbon monoxide is foamed when these meet in vessel 9. Suitable refractory fibers may be fed to either or both of vessels 1 or 9.

The foam, of closed cells containing CO, may be discharged as described above.

Having thus disclosed our invention, we claim:

1. The method for making fiber reinforced metal foam which comprises the steps of mixing a comminuted foaming agent, reinforcing fiber, and a low melting metal at a temperature at which the foaming agent does not yet decompose appreciably until a substantially uniform mix is obtained, and the combining this pre-mix with a higher melting metal at a temperature sufficient to decompose the foaming agent.

2. The method of claim 1, in which the mixing time is at least five minutes, and the mixing is done with rotating rollers, having a clearance on all sides of at least 1/32".

3. The method of claim 1, in which the said mix of fibers, low melting metal and foaming agent is fed continuously into a mixing vessel to which a high melting metal is also supplied, at a temperature which will cause foaming.

4. The method of claim 1, in which the said gas releasing agent is comminuted into particles having an average diameter not exceeding 10 microns, prior to admixing with the other said components.

5. The method for production of fiber reinforced metal foam which comprises feeding reinforcing fibers together with a gas releasing agent, a minor proportion of a metallic composition melting below the gas release temperature of said agent, and then adding a major proportion of a metal composition melting above the said gas release temperature into a mixing vessel, agitating by means of revolving rollers and removing the resultant fiber reinforced foam.

6. The method of claim 5, in which the said fibers, gas releasing agent and low melting alloy are thoroughly mixed in a vessel, which is continually discharging contents into a conjugate vessel, maintained at a temperature above the gas release temperature of the said agent, and into which the said higher melting metal composition is fed, and from which the resultant foam is continually removed.

7. The method of claim 5, in which the said rollers revolve both axially and planetarily.

8. The method of claim 5, in which the said gas releasing agent is a hydride, the said first metallic composition is a magnesium-aluminum eutectic, the said second metallic composition principally consists of aluminum, the temperature of mixing of the said gas releasing agent, fibers and eutectic alloy is below about 500° C., the temperature of final mixing with the last mentioned alloy is above 600° C., the axial speed of the said mixing rollers is between 20 and 1000 r.p.m. and the rotational speed of the planetary motion is between 25 and 500 r.p.m. and the clearance between the rollers and the walls of the vessel is at least 1/32".

9. The method of claim 5, in which the matrix of the resultant foam principally consists of zinc.

10. The method of claim 5, in which the matrix of the resultant foam principally consists of a ferrous alloy.

11. The method for continuous foaming of a metal melting substantially above 1000° C., which comprises the steps of feeding into one of the outer vessels of the machine, the principal metal, in which a metal oxide is dispersed, and into the other outer vessel a principal metal containing carbon, in amount stochiometrically balanced with the available oxygen in the first mentioned metal composition, then bringing these compositions into the bottom section of the central vessel, so as to cause the formation of carbon monoxide bubbles in the metal mass causing this to foam; and removing the resultant metal foam by overflow at the top of said central vessel.

12. The method of claim 11, in which refractory fibers are also fed to at least one of said outer vessels.

(References on following page)

References Cited

UNITED STATES PATENTS

| | | | |
|---|---|---|---|
| 2,751,289 | 6/1956 | Elliott | 75—20 R |
| 2,937,938 | 5/1960 | Fiedler et al. | 75—20 R |
| 3,047,383 | 7/1962 | Slayter | 75—20 R X |
| 3,087,233 | 4/1963 | Turnbull | 75—20 R X |
| 3,214,265 | 10/1965 | Fiedler | 75—20 R |
| 3,300,296 | 1/1967 | Hardy et al. | 75—20 R |
| 3,305,902 | 2/1967 | Bjorksten | 75—20 R X |
| 3,360,361 | 12/1967 | Albright et al. | 75—20 R |
| 3,403,008 | 9/1968 | Hamling | 75—20 R X |
| 3,406,025 | 10/1968 | Hamling | 75—20 R X |

FOREIGN PATENTS

| | | | |
|---|---|---|---|
| 811,814 | 4/1959 | Great Britain | 75—20 F |

L. DEWAYNE RUTLEDGE, Primary Examiner

J. E. LEGRU, Assistant Examiner

U.S. Cl. X.R.

29—191.2, 195; 259—6